US010318539B2

(12) United States Patent
Farrell et al.

(10) Patent No.: US 10,318,539 B2
(45) Date of Patent: Jun. 11, 2019

(54) METHOD AND APPARATUS FOR MANAGING INFORMATION ACROSS LIKE-CASES (71) Applicant: GENERAL ELECTRIC COMPANY, Schenectady, NY (US)

(72) Inventors: David Sean Farrell, San Ramon, CA (US); Branko Bibic, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 15/079,563

(22) Filed: Mar. 24, 2016

(65) Prior Publication Data
US 2017/0277757 A1 Sep. 28, 2017

(51) Int. Cl.
*G06F 16/248* (2019.01)
*G06F 16/2457* (2019.01)
*G06Q 10/06* (2012.01)

(52) U.S. Cl.
CPC ...... *G06F 16/248* (2019.01); *G06F 16/24575* (2019.01); *G06Q 10/06311* (2013.01)

(58) Field of Classification Search
CPC ......... G06F 17/30477; G06F 17/30424; G06F 17/30554; G06F 16/248; G06F 16/24575; G06Q 10/06311
USPC ........................... 707/769, 999.003, 999.102
See application file for complete search history.

(56) References Cited

U.S. PATENT DOCUMENTS

| | | | | |
|---|---|---|---|---|
| 5,666,481 A | * | 9/1997 | Lewis | G06F 11/2257 714/15 |
| 5,799,148 A | | 8/1998 | Cuddihy et al. | |
| 5,999,938 A | * | 12/1999 | Bliss | G06F 9/44 |
| 8,683,317 B2 | | 3/2014 | Caldwell et al. | |
| 2004/0103121 A1 | | 5/2004 | Johnson et al. | |
| 2005/0193004 A1 | | 9/2005 | Cafeo et al. | |
| 2008/0168135 A1 | * | 7/2008 | Redlich | G06Q 10/10 709/204 |

(Continued)

FOREIGN PATENT DOCUMENTS

KR 20080073598 A 8/2008
TW 201437804 A 10/2014
(Continued)

OTHER PUBLICATIONS

Fong, A. C. M., and Hui, S. C., "An intelligent online machine fault diagnosis system," Computing and Control Engineering Journal, vol. 12, Issue No. 5, pp. 217-223 (Oct. 1, 2001).
(Continued)

*Primary Examiner* — Dung K Chau
(74) *Attorney, Agent, or Firm* — Fitch, Even, Tabin & Flannery LLP (57) ABSTRACT

Approaches are provided for an apparatus having an interface, a memory, a display device, and a processor. The memory store a first case data structure having a first content field and a second case data structure having a second content field with a selection command. The processor receives via an input of the interface a selection of the selection command. In response to receiving the selection, the processor automatically populates content of the first content field of the first case data structure with a content of the second content field of the second case data structure.

14 Claims, 5 Drawing Sheets

(56) References Cited

U.S. PATENT DOCUMENTS

| | | | |
|---|---|---|---|
| 2009/0204881 A1 | 8/2009 | Murthy et al. | |
| 2009/0292505 A1* | 11/2009 | Van Dyke | G01H 1/00 |
| | | | 702/184 |
| 2011/0022622 A1 | 1/2011 | Boroczky et al. | |
| 2013/0014046 A1* | 1/2013 | Watts | G01W 1/00 |
| | | | 715/772 |
| 2013/0073557 A1 | 3/2013 | Nezhad et al. | |
| 2015/0358207 A1 | 12/2015 | Baldock et al. | |
| 2017/0270767 A1* | 9/2017 | Farrell | G01R 19/0038 |

FOREIGN PATENT DOCUMENTS

| | | |
|---|---|---|
| WO | 2009083886 A1 | 7/2009 |
| WO | 2015055373 A2 | 4/2015 |
| WO | 2017/052531 A1 | 3/2017 |

OTHER PUBLICATIONS

International Search Report and Written Opinion issued in connection with corresponding PCT Application No. PCT/US2017/23237 dated May 29, 2017.

* cited by examiner

METHOD AND APPARATUS FOR MANAGING INFORMATION ACROSS LIKE-CASES

BACKGROUND

Technical Field

The subject matter disclosed herein generally relates to managing information across like-cases. More specifically, the subject matter relates to populating characteristics from prior like-cases to a given case. More specifically, the subject matter relates to populating characteristics of prior like-cases having similar problem type characteristics and related machine type characteristics as compared to a given case.

Brief Description of the Related Art

In industrial operations, industrial machines and systems are monitored to ensure proper operation and/or detect anomalies which may arise. Remote Monitoring & Diagnostic (M&D) approaches often include personnel at one location communicating with personnel at an operating site located at a separate, geographically remote location. The M&D personnel view information related to industrial machines or systems located at the operating site.

During operation, problems oftentimes occur which may warrant an operator or maintenance engineer's involvement. Using known information related to the industrial machine or system, M&D personnel provide recommendations to personnel at the operating site.

In some occasions, similar problems have previously occurred on a given industrial machine or a similar industrial machine. M&D personnel in some instances are unable to view and consider prior cases involving the same or similar machine, or the same or similar problem. Even in instances where M&D personnel are able to view and consider prior cases, the personnel are often unable to efficiently correlate relevant characteristics of prior cases involving the same or similar machine, or the same or similar problem, with a current case.

The above-mentioned problems have resulted in some user dissatisfaction with previous approaches, inefficient case resolution, and sub-optimal application of remote monitoring and diagnostic approaches.

BRIEF DESCRIPTION OF THE DISCLOSURE

The approaches described herein provide for populating information across multiple case data structures. The multiple case data structures have common characteristics relating to problems associated with industrial machines or systems. Approaches discussed herein provide for population of information from at least one prior case data structure to a current case data structure, where the prior cases have at least one characteristic common with the current case (such as a characteristic associated with a problematic industrial machine or system). Approaches also provide for linking a current case with one or more prior cases.

In many of these embodiments, an apparatus includes a memory device. The memory device stores a first case data structure and a second case data structures. The first case data structure includes a first content field representing characteristics of a first case associated with a first abnormality detected in a first industrial machine or system. The second case data structure includes a second content field representing characteristics of a second case associated with a second abnormality detected in a second industrial machine or system. The second content field also includes a selection command.

In some approaches, the first industrial machine or system is the same as the second industrial machine or system. In other approaches the first industrial machine or system is physically distinct from the second industrial machine or system, but they share some common characteristics.

The apparatus further includes an interface including an input. The apparatus also includes a display device configured to display at least the second case data structure.

The apparatus also includes a processor. The processor is coupled to the memory device, the interface, and the display device. The processor is configured to receive via the input of the interface a selection of the selection command. In response to receiving the selection, the processor is configured to automatically populate the first content field of the first case data structure with a content of the second content field of the second case data structure.

In one approach, in response to receiving the selection, the processor is further configured provide an indicator that the first content field of the first case data structure has been populated. The indicator is stored in the first content field of the first case data structure of the memory. In some approaches, the indicator includes a visual indication. The visual indication is displayed at the displayed device.

In some approaches, the indicator includes a link to the second content field of the second case data structure. The link is stored in the first content field of the first case data structure of the memory.

In another aspect, a method includes storing a first case data structure in a memory device. The first case data structure includes a first content field representing characteristics of a first case associated with a first abnormality detected in a first industrial machine or system.

The method further includes storing a second case data structure in the memory device. The second case data structure includes a second content field representing characteristics of a second case associated with a second abnormality detected in a second industrial machine or system. The second content field includes a selection command.

In some approaches, the first industrial machine or system is the same as the second industrial machine or system. In other approaches the first industrial machine or system is different than the second industrial machine or system.

The method further includes displaying at least the second case data structure at a display device. The method further includes selecting the selection command. The method further includes, in response to the selecting, automatically populating the first content field of the first case data structure with a content of the second content field of the second case data structure.

In some aspects, the method further includes, in response to the selecting, providing an indicator that the first content field of the first case data structure has been populated. The method further includes storing the indicator in the first content field of the first case data structure of the memory device. In some approaches, the indicator includes a visual indication displayed at the display device.

In some approaches, the method further includes storing a link to the second content field of the second case data structure in the first content field of the first case data structure of the memory device.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE DISCLOSURE

Figure 1:
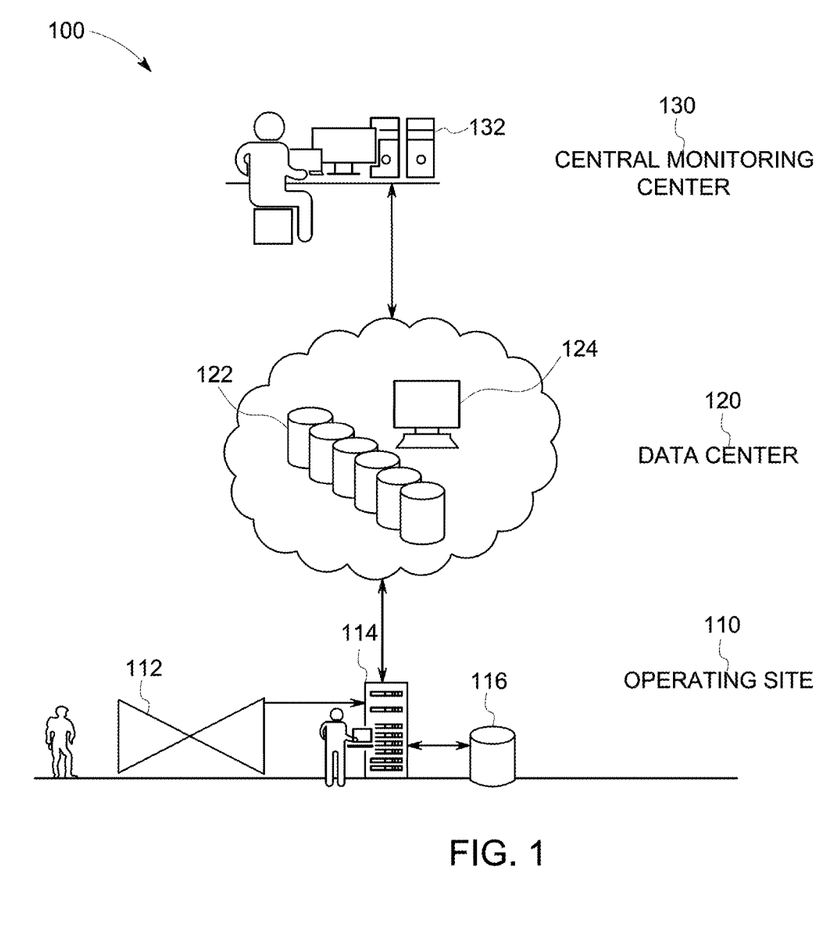
FIG. 1 comprises an illustration of an informational flow chart for providing information relating to industrial machines or systems according to various embodiments of the present invention.

Referring now to FIG. 1, a system 100 for monitoring industrial machines includes an operating site 110, optionally, a data center 120, and a central monitoring center 130. The operating site 110 includes one or more industrial machines, equipment, or systems of industrial machines or equipment 112. Examples of industrial machines 112 monitored in system 100 include aircraft machinery (e.g., turbine engines), marine machinery, mining machinery, oil machinery, gas machinery, health care machinery, telecom machinery, to mention a few examples. Other examples are possible.

Industrial machine 112 is operably connected to a local computing device 114 such that the computing device 114 receives or obtains information from the industrial machine 112. The computing device 114 may be continuously connected to the industrial machine 112, or may be removably connected to the industrial machine 112. In one approach, the computing device 114 is located at the operating site 110. In other approaches, the computing device 114 is instead located remotely from the industrial machine 112.

Information received at the computing device 114 from the industrial machine 112 includes operational characteristics of the industrial machine 112. Operational characteristics may include a measured temperature, a measured vibration, a measured pressured, a calculated efficiency, a structural defect, a lifespan of machine, a machine history, and/or a detected position shift. Other examples are possible.

The computing device 114 may be any type of hardware device such as a personal computer, a tablet, a cellular telephone, and/or a personal digital assistant. Other examples are possible. The computing device 114 may include a processor, an interface (e.g., a computer based program and/or hardware) having an input (which may also include a user input) and an output, a memory, and a display device (e.g., a screen or a graphical user interface which allows for a visualization to be made). In this way, a user of the computing device 114 is able to observe information at the computing device 114 (such as operational characteristics of the industrial machine 112), input information into the computing device 114, send information from the computing device 114 to a remote device (such as at the data center 120 or the central monitoring center 130), and receive information from a remote device. The computer device 114 may be configured to run specific software applications, such as a historian.

The computing device 114 is operably connected to a data storage module 116. The data storage module 116 includes a memory for short- and/or long-term storage of information received from the computing device 114. Examples of information received and stored at the data storage module 116 include historical information relating to the industrial machine 112, or information received at the computing device from a remote device (such as at the data center 120 or the central monitoring center 130).

The optional data center 120 is in communication with the operating site 110 (preferably, with the computing device 114 at the operating site) such that the data center 120 can send and/or receive information pertaining to one or more industrial machines 112 located at the operating site 110. The data center 120 may be located at the operating site 110, at the central monitoring center 130, or in a location geographically remote from the operating site 110 and the central monitoring center 130. In one approach, the data center 120 is disposed on a cloud based network.

The data center 120 includes one or more data storage modules 122 having corresponding memories. The data center 120 may also include one or more computing devices 124 that include a processor, an interface having an input (which may include a user input) and an output, a memory, and a display device (e.g., a screen or a graphical user interface which allows for a visualization to be made). Various applications may be performed at the data center 120, including analytic modeling, anomaly detection, and/or calculations of key performance indicators.

The central monitoring center 130 includes a computing device 132 that is in communication with the data center 120 such that the central monitoring center 130 can send and/or receive information pertaining to one or more industrial machines 112 located at the operating site 110. Alternatively, the central monitoring center 130 is in communication with the operating site 110 (preferably, with the computing device 114 at the operating site) such that the central monitoring center 130 can send and/or receive information pertaining to one or more industrial machines 112 located at the operating site 110.

In one example of the operation of the system of 100 of FIG. 1, when an anomaly, abnormality, or incident is detected in an industrial machine or system (such as machine 112), a case data structure, discussed in greater detail elsewhere herein, associated with the case is created. As used herein, a "case" is associated with an anomaly, an abnormality, or an incident detected in an industrial machine or system, and a "case data structure" includes a data structure that represents a compilation of characteristics of the case. In one approach, the case data structure is generated by personnel at the central monitoring center 130. In another approach, the case data structure is generated at a local computing device (e.g., local computing device 114 at the operating site 110). In either approach, a user may link evidence, expert interpretation associated with the evidence, metadata describing the particular nature of the industrial machine at issue, and/or other relevant information such that a visual aid is created. When a case is resolved, the case data structure is stored in a memory (e.g., in data storage modules 122 at data center 120, or in computing device 132 at the remote monitoring center 130).

As discussed in greater detail elsewhere herein, the computing device 132 includes a memory configured to store a first case data structure and a second case data structure. The first case data structure corresponds to a current, unresolved, and/or open case. The first case data structure includes a first content field representing characteristics of a first case associated with a first abnormality detected in a first industrial machine or system. The second case data structure corresponds to a prior, resolved, and/or closed case. The second case data structure includes a second content field representing characteristics of a second case associated with a second abnormality detected in a second industrial machine or system. The second content field also includes a selection command.

The computing device 132 displays the second case data structure at a display of the computing device 132. A user at the remote data center 130 views the second case data structure to determine whether any information of the second case data structure is helpful or otherwise relevant to the first case data structure. If so, the user selects (for example, using a mouse cursor) the selection command of the second content field of the second case data structure. In response to receiving the selection, the computing device 132 automatically populates the first content field of the first case data structure with a content of the second content field of the second case data structure.

Figure 2:
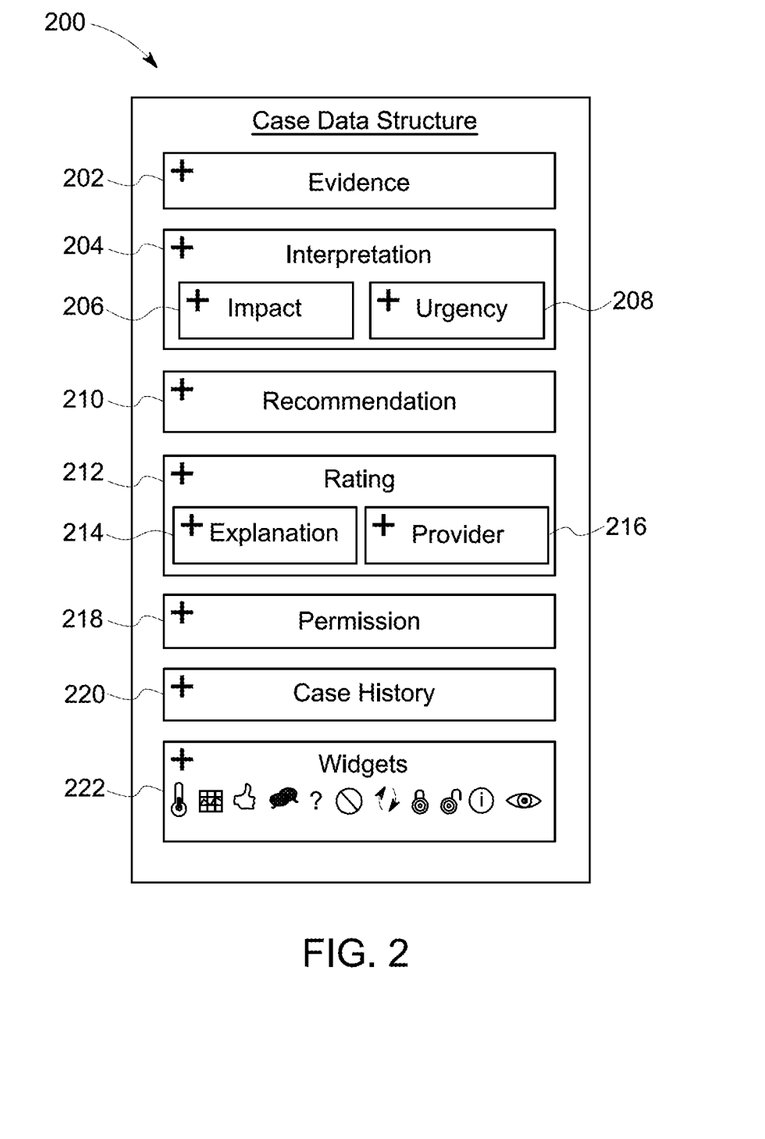
FIG. 2 comprises a block diagram illustrating an exemplary case data structure for managing information relating to industrial machines or systems according to various embodiments of the present invention.

An example case data structure 200 is shown in FIG. 2. The case data structure 200 may include an evidence field 202 with evidence. The evidence includes information associated with the anomaly and/or the industrial machine 112. For example, the evidence associated with the industrial machine or system may include: a measured temperature, a measured vibration, a measured pressured, a calculated efficiency, a structural defect, a lifespan of machine, a machine history, and/or a detected position shift. The evidence may be in the form of advisories, alarms, charts, or reports.

The case data structure 200 may also include an interpretation field 204 with one or more interpretations. The interpretation includes a user determined condition based at least in part on the evidence. For example, the interpretation may be: a case diagnosis, a case prognosis, a case impact, and/or a case urgency.

The interpretation field 204 may include an impact field 206 for storing an impact value. The impact value provides an indication of a potential harm posed by the abnormality detected in the industrial machine or system 112. For example, an assessed impact associated with a problematic machine on an oil platform may be a given number of barrels of lost production. If the number of barrels of lost production is relatively minor, the impact field is assigned a low impact value. Conversely, if the number of barrels of lost production is relatively major, the impact field is assigned a high impact value.

The interpretation field 204 further may include urgency field 208 for storing an urgency value. The urgency value is an indication of timing associated with the potential harm posed by the abnormality detected in the industrial machine or system. In some approaches, the urgency value is an indication of how soon an analyst determines the abnormality should be addressed. In other approaches, the urgency value is an indication of how soon the harm posed by an abnormality is expected to occur. For example, if the expected lost production for an oil platform is anticipated to occur in the relatively near future, the urgency field is assigned a first urgency value indicative of this timing. If the expected lost production is anticipated to occur in the relatively distant future, the urgency field is assigned a second urgency value indicative of this timing.

The case data structure 200 also includes a recommendation field 210 with one or more recommendations. The recommendation includes a user determined course of action to undertake with respect to the industrial machine or system based at least in part on the interpretation. For example, the recommendation may be: watch, wait, manual inspection, offline analysis, contact subject matter expert, contact original equipment manufacturer, change operation, invasive inspection, minor maintenance, schedule work, and/or shut down.

The case data structure 200 may also include a rating field 212 for storing one or more ratings. The rating field 212 may include an explanation field 214 for storing a rating explanation and/or a provider field 216 for storing a rating provider.

The case data structure 200 may also include a permission field 218, a case history field 220, and/or one or more widgets 222. The case history field 220 may include, for example, a case outcome.

As discussed in greater detail elsewhere herein, the various content fields are provided with a selection command.

The case data structure 200 is structured so as to allow a user to provide updates to the case, to evidence relating to the case, to their expert interpretation as to the meaning and implication of the evidence (that is, what the issue might be, and what to do about it at a particular time), and to their recommendation regarding actions to be taken. Additional abnormalities which may occur prior to or after the creation of the case data structure 200 may also be linked to the created case data structure 200. Ancillary capabilities such as collaboration, workflow with assignment/request timers, analytic escalation notifications, and other constructs can be input and stored in the case data structure 200. That is, whatever data structure is used, the case data structure 200 is easily modified.

The information contained in a case data structure 200 may be used to assist analysts in ascertaining a solution to the present case. Furthermore, assessment of prior case data structures associated with prior cases often provides valuable insight into the resolution of a present case involving the same or similar industrial machines or system. For example, assessment of a prior case data structure may be used in subsequent cases to better aid analysts in providing recommendations that have historically been shown to be effective. In this regard, selections of fields of a prior case data structure may be linked to a current case data structure. Selections of fields of a prior case data structure may also be used to populate fields of a current case data structure.

Figure 3:
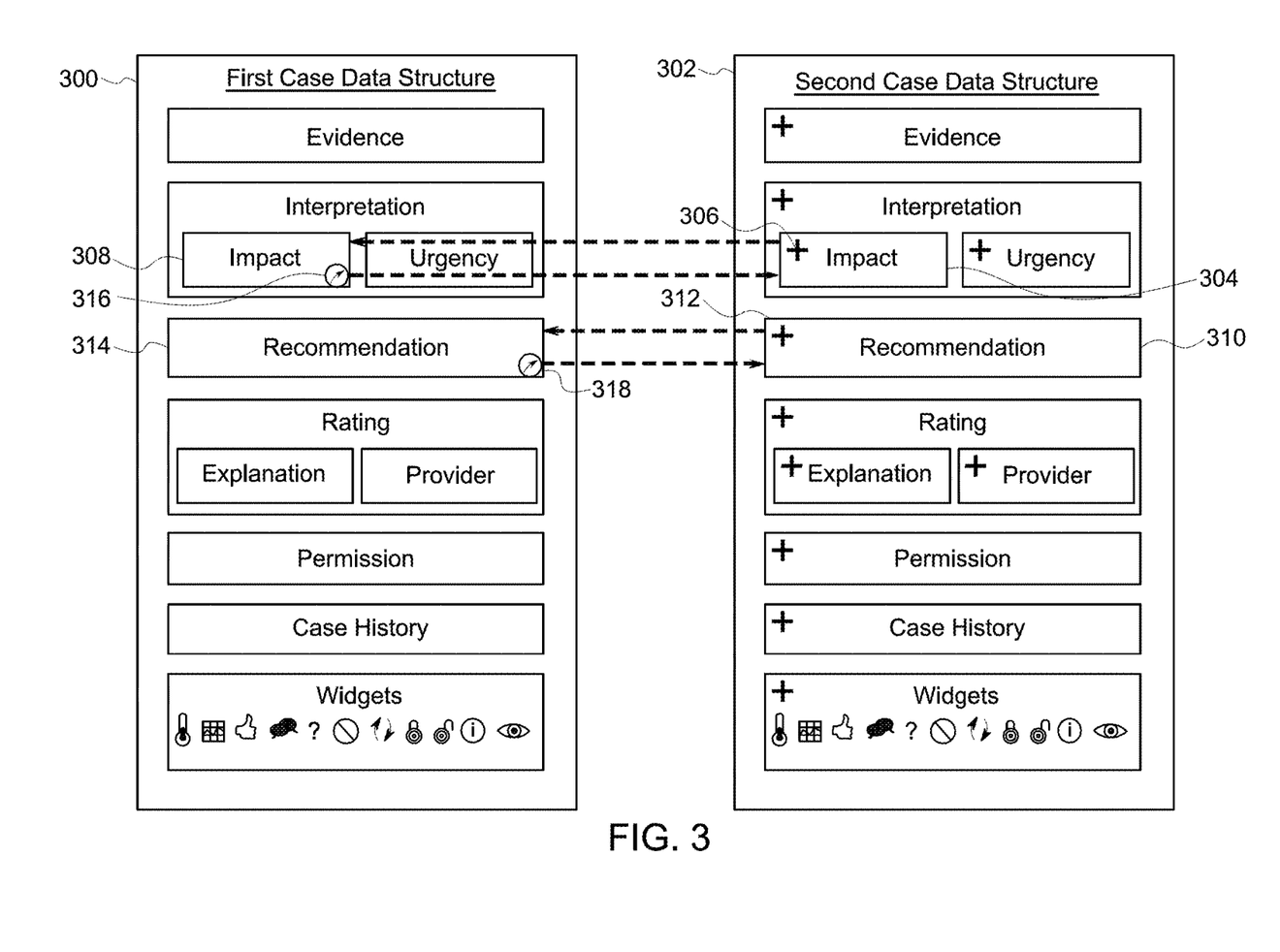
FIG. 3 comprises a block diagram illustrating exemplary case data structures for managing information relating to industrial machines or systems according to various embodiments of the present invention.

With reference to FIG. 3, a first case data structure 300 corresponds to a case associated with an anomaly, an abnormality, or an incident detected in an industrial machine or system. In a preferred approach, the first case data structure 300 corresponds to a current, unresolved, and/or open case. For example, the current case may relate to anomalies detected at a gas turbine at operating site 110, where the cause of the anomalies is currently unknown. The first case data structure 300 includes a data structure that represents a compilation of characteristics of the current case, and preferably includes one or more of the fields previously discussed with respect to the case data structure 200 of FIG. 2.

A second case data structure 302 is also provided. In a preferred approach, the second case data structure 302 corresponds to a prior, resolved, and/or closed case. For example, the prior case may relate to anomalies detected two years ago in a gas turbine model similar to that of the current case. Unlike the current case, the cause of the anomalies was determined and correct. Thus, the prior case was resolved and closed. In another approach, the second case data structure 302 corresponds to another current case, different than the first current case of the first case data structure 300.

Similar to the first case data structure 300, the second case data structure 302 includes a data structure that represents a compilation of characteristics of the prior case, and preferably includes one or more of the fields previously discussed with respect to the case data structure 200 of FIG. 2.

The second case data structure 302 has at least one characteristic in common with the first case data structure 300. In one approach, the first case data structure 300 and the second case data structure 302 have a common machine type. The machine type may be any type of industrial machine 112 monitored in system 100 as discussed with respect to FIG. 1, for example, a gas turbine. In another approach, the first case data structure 300 and the second case data structure 302 have a common problem type. The problem type may be any type of anomaly, abnormality, or incident associated with such industrial machines, such as a detected axial position shift. Other examples of common characteristics are possible. The commonality may be determined automatically (e.g., by computing device 132 at the central monitoring center 130 of FIG. 1) or may be performed manually (e.g., by an analyst at the central monitoring center 130 of FIG. 1). Various approaches may be used to determine commonality, such as automatic or manual filtering of prior cases.

A user may view the second case data structure 302 at a computing device, such as computing device 132 at central monitoring center 130 of FIG. 1. In some approaches, information contained in the second case data structure 302 may be used by the user in ascertaining a resolution to a current case. For example, a user may determine that a prior assessed impact and recommendation provided in a prior case pertaining to an axial position shift detected on a gas turbine is relevant to a current case involving an axial position shift on a similar gas turbine.

In this way, approaches are provide to permit a user to select one or more characteristics stored in the content fields of the second case data structure 302. The selected information is then populated into corresponding content fields of the first case data structure 300. As used herein, information is "populated" in a current case data structure when it is entered, copied, or moved into a content field of the current case data structure. In one approach, the information is replicated from a content field of the prior case data structure into a content field of the current case data structure. In another approach, the information entered into the current case data structure is representative of the information from the prior case data structure. In still another approach, the information is representative of the existence of the prior case data structure.

In one aspect, one or more of the content fields of the second case data structure 302 includes a user selection command that permits a user to populate the first case data structure upon command. The user selection command may be stored as code in the content fields of prior case data structures. The user selection command may also have a corresponding visual user selection command. As shown in FIG. 3, the visual user selection command may be a "+" symbol. Any suitable graphical representation may be used. The visual user selection command allows a user to select a corresponding content field of the second case data structure 302 as relevant to the first case data structure 300. Upon user selection of a user selection command, information from the second case data structure 302 is populated in the first case data structure 300. For example, a prior impact assessment in a prior impact assessment field 304 in second case data structure 302 may be deemed by a user to be relevant to a current case. The user is presented with a visual user selection command 306 corresponding to the information contained in the prior impact assessment field 304. Upon selection of the visual user selection command 306, information contained in the prior impact assessment field 304 is automatically populated in corresponding current impact assessment field 308. In another example, a prior recommendation assessment in a prior recommendation assessment field 310 in second case data structure 302 may be deemed by a user to be relevant to a current case. The user is presented with a visual user selection command 312 corresponding to the information contained in the prior recommendation assessment field 310. Upon selection of the visual user selection command 312, information contained in the prior recommendation assessment field 310 is automatically populated in corresponding current recommendation assessment field 314.

In some approaches, information from a second case data structure is manually selected to be populated in a first case data structure. Such manual selection may be performed, for example, by an analyst at central monitoring center 130 of FIG. 1. In other approaches, information from a second case data structure is automatically selected to be populated in a first case data structure. Such automatic selection may be performed, for example, by the computing device 132 at central monitoring center 130 of FIG. 1. In still other approaches, information from a second case data structure is selected to be populated in a first case data structure through a combination of manual and automatic selections.

In another aspect, content fields of a case data structure having information populated by content fields of another case data structure may be provided with an indicator signifying information was populated from another case. The indicator may be stored as code in the content fields of the case data structure. The indicator may also have a corresponding visual indication. In the example of FIG. 3, impact assessment field 308 of the first case data structure is provided with visual indictor 316 to indicate the impact assessment field 308 was, at least in part, populated with information from another case data structure (e.g., prior impact assessment field 304 of second case data structure 302). Similarly, recommendation assessment field 314 of the current case data structure is provided with visual indictor 318 to indicate the recommendation assessment field 314 was, at least in part, populated with information from another case data structure (e.g., prior recommendation assessment field 310 of second case data structure 302).

In still another aspect, one or more of the indicators of a case data structure may include a link. The link may be stored as code in the content fields of the case data structure. The link corresponds to the prior case data structure from which the populated content originated. The link may be a hypertext link or any other approach suitable for retrieving the prior case data structure from which the populated content originated. In one aspect, the link is a hypertext link that, upon selection, opens the origin prior case data structure in a new web browser. In another aspect, the origin prior case data structure is provided in a bubble that appears when the user hovers a mouse cursor over the link.

In some aspects, a link may be provided in one or more content fields of the first case data structure prior to, or without, a user selection of a selection command. In this way, in response to determining the second case data structure has at least one characteristic in common with the first case data structure (e.g., similar machine type or similar problem type), a link may be automatically populated in a content field of the first case data structure. Automatically populating links upon determining commonality between case data structures permits a user to quickly access common data structures.

Figure 4:
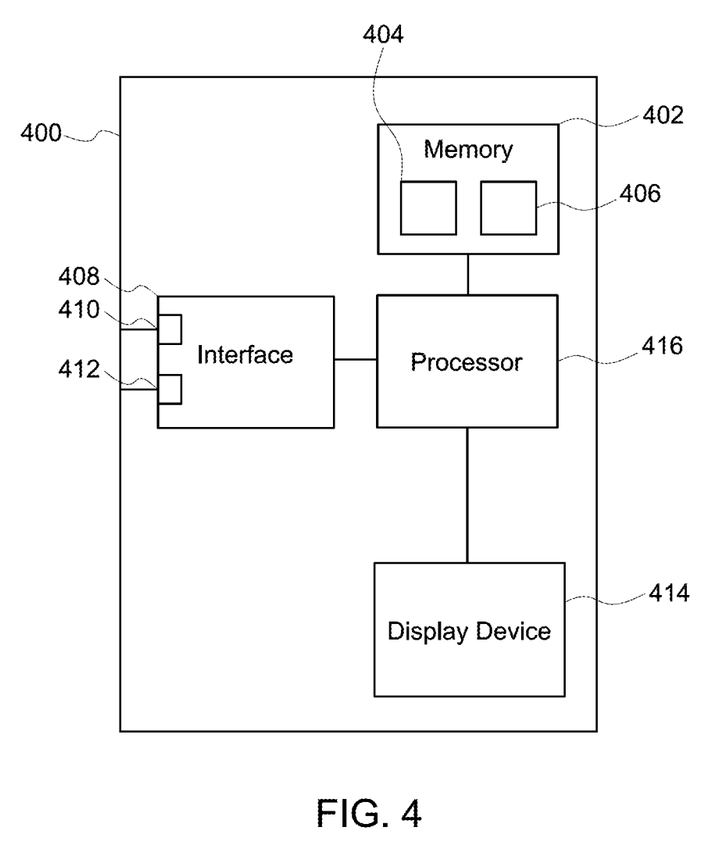
FIG. 4 comprises a block diagram illustrating an exemplary apparatus for managing information relating to industrial machines or systems according to various embodiments of the present invention.

With reference now to FIG. 4, an apparatus 400 (such as computing device 132 of FIG. 1) includes a memory device 402. The memory may be any suitable type of memory, including volatile or nonvolatile memories such as random access memory (RAM), dynamic RAM (DRAM), synchronous RAM (SRAM), read only memory (ROM), programmable ROM (PROM), erasable PROM (EPROM), electrically erasable PROM (EEPROM), non-volatile RAM (NVRAM), flash memory, solid state drives (SSD), embedded Multi-Media Card (eMMC). The memory device 402 stores a first case data structure 404 and a second case data structure 406. As discussed with respect to the case data structure 200 of FIG. 2, the case data structures 404, 406 represent characteristics of cases associated with abnormalities detected in industrial machines or systems. The first case data structure includes a first content field representing characteristics of a first case associated with a first abnormality detected in a first industrial machine or system. The second case data structure includes a second content field representing characteristics of a second case associated with a second abnormality detected in a second industrial machine or system. In some approaches, the first industrial machine or system is the same as the second industrial machine or system. In other approaches the first industrial machine or system is different than the second industrial machine or system.

The apparatus 400 further includes an interface 408 including an input 410 (which preferably includes a user input) and an output 412. The apparatus 400 also includes a display device 414 configured to convey information to a user, such as the first case data structure 404 and/or the second case data structure 406. The display device 414 may be a liquid crystal display screen, a light-emitting diode backlit liquid crystal display screen, or other screen capable of conveying information.

The second content field of the second case data structure also includes a selection command. The user selection command may also have a corresponding visual indication for display at the display device 414. The visual indication may be, for example, visual user selection command 306 of FIG. 3. The visual user selection command allows a user to select a content field of the second case data structure 406 to populate information into a corresponding content field of the first case data structure 404.

The apparatus 400 also includes a processor 416. The processor 416 is coupled to the memory device 402, the interface 408, and the display device 414. The processor 416 is configured to receive via the input 410 of the interface 408 a selection of the selection command. The selection may be provided, for example, through a mouse selection of the selection command.

In response to receiving the selection, the processor 416 is configured to populate the first content field of the first data structure 404 with a content of the second content field of second case data structure 406. In a preferred approach, the first and second content fields correspond to each other. Content fields are correspond when they are intended to contain the same or similar types of information. By "populate," and as used herein, it is meant to associate a first software routine or module with a second one. For example, the first software module (e.g., first case data structure 404) may include a template portion that is replaced or augmented with information from the second software module (e.g., second case data structure 406) upon association. In one approach, the information is replicated from the second content field of the second data structure 406 into the first content field of the first case data structure 404. In another approach, the information entered into the first case data structure 404 is representative of the information from second case data structure 406. In still another approach, the information is representative of the existence of the second case data structure 406.

In a preferred approach, content is "automatically" populated from a content field of a data structure to another content field of another data structure such that no intervening user steps are necessary. Other approaches are possible.

In one aspect, in response to receiving the selection, the processor 416 is further configured to provide an indicator that the first content field of the first case data structure 404 has been populated by another case data structure. The indicator is stored, for example, as code in the first content field of the first case data structure 404 of the memory device 402. The indicator may also have a corresponding visual indication, such as visual indictor 316 of FIG. 3.

In some approaches, the indicator includes a link to the second content field of the second case data structure 406. The link is stored, for example, as code in the first content field of the first data structure 404 of the memory device 402. The link corresponds to the second case data structure 406. The link may be a hypertext link or any other approach suitable for retrieving the second case data structure 406 for display on the display device 414. In one aspect, the link is a hypertext link that, upon selection, opens the second case data structure 406 in a new web browser. In another aspect, second case data structure 406 is provided in a bubble that appears when the user hovers a mouse cursor over the link.

In another aspect, the processor 416 is further configured to receive via the input 410 of the interface 408 a second selection of a second selection command corresponding to a fourth content field of the second case data structure 406. In response to receiving the second selection, the processor 416 is configured to populate information in a third content field of the first case data structure 404. In response to receiving the second selection, the processor 416 may further be configured provide a second indicator in the third content field of the first case data structure 404. The second indicator is preferably stored in the third content field of the first case data structure 404 of the memory device 402. In some approaches, second indicator includes a second link to the fourth content field of the second case data structure 406. The second link is preferably stored in the third content field of the first data structure 404 of the memory device 402.

Figure 5:
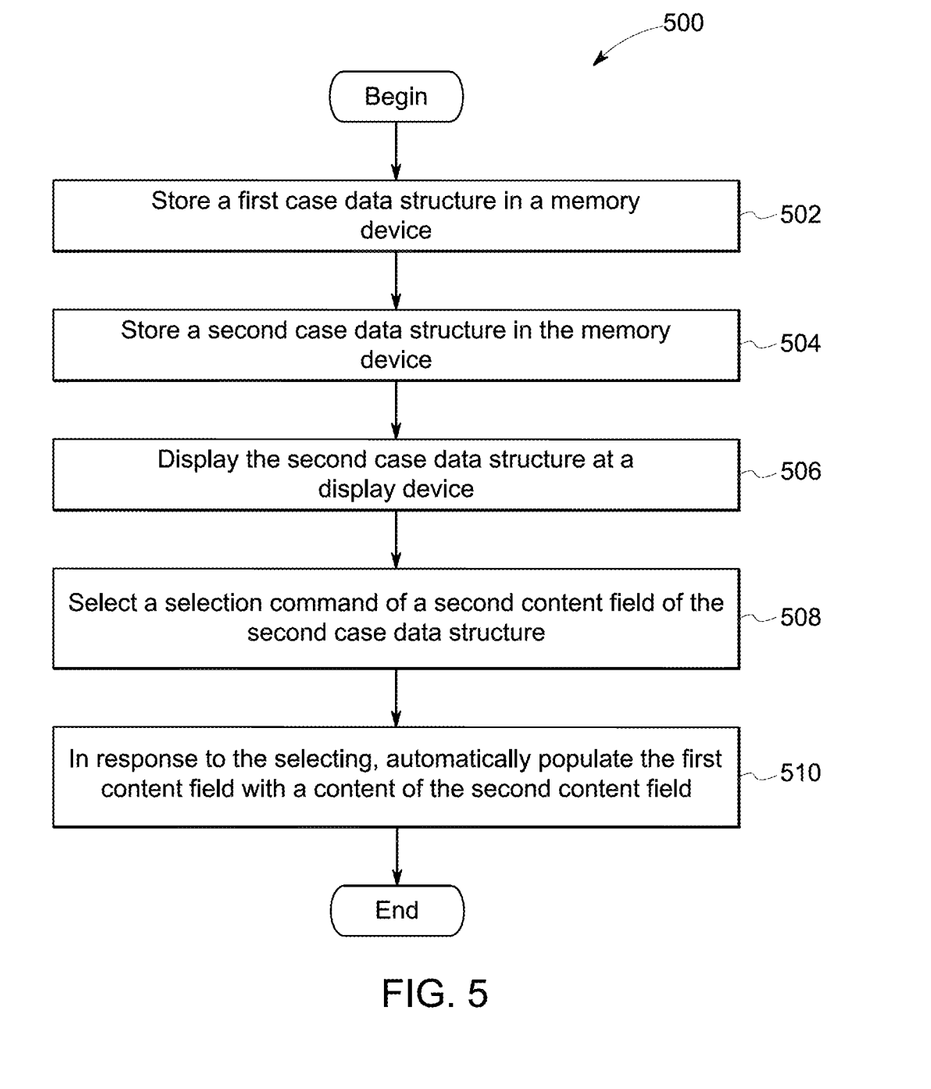
FIG. 5 comprises an operational flow chart illustrating an approach for case management according to various embodiments of the present invention.

Turning now to FIG. 5, a method 500 includes storing 502 a first case data structure in a memory device. As discussed with respect to the case data structure 300 of FIG. 3, the first case data structure includes a first content field representing characteristics of a first case associated with a first abnormality detected in a first industrial machine or system. In a preferred approach, the first case data structure corresponds to a current, unresolved, and/or open case. For example, the current case may relate to anomalies detected at a gas turbine at operating site 110, where the cause of the anomalies is currently unknown.

The method 500 further includes storing 504 a second case data structure in the memory device. The second case data structure includes a second content field representing characteristics of a second case associated with a second abnormality detected in a second industrial machine or system. In a preferred approach, the second case data structure corresponds to a prior, resolved, and/or closed case. For example, the prior case may relate to anomalies detected two years ago in a gas turbine model similar to that of the current case. Unlike the current case, the cause of the anomalies was determined and correct. Thus, the prior case was resolved and closed. In another approach, the second case data structure corresponds to another current case, different than the first current case of the first case data structure. The second content field also includes a selection command. In some approaches, the selection command may be represented by a visual indication, such as visual user selection commands 306, 312 of FIG. 3.

In some approaches, the first industrial machine or system is the same as the second industrial machine or system. In other approaches the first industrial machine or system is different than the second industrial machine or system.

The method 500 further includes displaying 506 at least the second case data structure at a display device. The method further includes selecting 508 the selection command.

The method 500 further includes, in response to the selecting, automatically populating 510 the first content field of the first case data structure with a content of the second content of the second case data structure. In one approach, the information is replicated from the first content field of the second data structure into the first content field of the first case data structure. In another approach, the information entered into the first case data structure is representative of the information from second case data structure. In still another approach, the information is representative of the existence of the second case data structure.

In some approaches, the method 500 further includes, in response to the selecting, providing an indicator in the first content field of the first case data structure. The indicator indicates at least some information was populated from the second case data structure. The indicator is stored, for example, as code in the first content field of the first case data structure of the memory device. The indicator may also have a corresponding visual indication, such as visual indictor 316 of FIG. 3. In some approaches, the method 500 further includes storing the indicator in the first content field of the first case data structure of the memory.

In some approaches, the indicator includes a link from the first content field back to the second case data structure. The link corresponds to the second case data structure. The link may be a hypertext link or any other approach suitable for retrieving the second case data structure for display on the display device. In one aspect, the link is a hypertext link that, upon selection, opens the second case data structure in a new web browser. In another aspect, second case data structure is provided in a bubble that appears when the user hovers a mouse cursor over the link. In some approaches, the method 500 further includes storing the link in the first content field of the first case data structure of the memory.

In still other approaches, the method 500 includes receiving a second selection of a second selection command. The second selection command corresponds to a fourth content field of the second case data structure. The method 500 preferably includes, in response to receiving the second selection, automatically populating a third content field of the first case data structure with a content of the fourth content field of the second case data structure.

In some aspects, the method 500 includes, in response to receiving the second selection, providing a second indicator in the third content field of the first case data structure. The method 500 may further include storing the second indicator in the third content field of the first case data structure of the memory device.

In one approach, the second indicator includes a second link to the fourth content field of the second case data structure. In some aspects, the method further includes storing the second link in the third content field of the first case data structure of the memory device.

In this way past, "like-cases" may be correlated with a current case to assist a user in assessing a current case.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An apparatus comprising:
   an interface with an input;
   a memory, the memory configured to store:
      a first case data structure, the first case data structure comprising a first content field representing characteristics of a first case associated with a first abnormality detected in a first industrial machine or system, the first abnormality detected being related to one or more of a temperature, a vibration, a pressure, an efficiency, a lifespan, a structural defect, a history, and a position shift of the first industrial machine or system; and
      a second case data structure, the second case data structure comprising a second content field representing characteristics of a second case associated with a second abnormality detected in a second industrial machine or system, the second abnormality detected being related to one or more of a temperature, a vibration, a pressure, an efficiency, a lifespan, a structural defect, a history, and a position shift of the second industrial machine or system, the second content field comprising a selection command;
   a display device configured to display the second case data structure; and
   a processor coupled to the interface, the memory, and the display device, the processor configured to receive via the input a selection of the selection command, the processor configured to, in response to receiving the selection, automatically populate the first content field with a content of the second content field.

2. The apparatus of claim 1, wherein in response to receiving the selection, the processor is further configured to provide an indicator that the first content field of the first case data structure has been populated, wherein the indicator is stored in the first content field of the first case data structure of the memory.

3. The apparatus of claim 1, wherein the indicator includes a visual indication.

4. The apparatus of claim 2, wherein the indicator includes a link to the second content field of the second case data structure, and wherein the link is stored in the first content field of the first case data structure of the memory.

5. The apparatus of claim 1, wherein the first industrial machine or system is the same as the second industrial machine or system.

6. The apparatus of claim 1, wherein the first industrial machine or system is different than the second industrial machine or system.

7. The apparatus of claim 1, wherein the first case corresponds to a current case, and wherein the second case corresponds to a prior case.

8. A method comprising:
   storing a first case data structure in a memory device, the first case data structure including a first content field representing characteristics of a first case associated with a first abnormality detected in a first industrial machine or system, the first abnormality detected being related to one or more of a temperature, a vibration, a pressure, an efficiency, a lifespan, a structural defect, a history, and a position shift of the first industrial machine or system;
   storing a second case data structure in the memory device, the second case data structure including a second content field representing characteristics of a second case associated with a second abnormality detected in a second industrial machine or system, the second content field comprising a selection command, the second abnormality detected being related to one or more of a temperature, a vibration, a pressure, an efficiency, a lifespan, a structural defect, a history, and a position shift of the second industrial machine or system;
   displaying the second case data structure at a display device;
   selecting the selection command; and
   in response to the selecting, automatically populating the first content field with a content of the second content field.

9. The method of claim 8, further comprising:
   in response to the selecting, providing an indicator that the first content field of the first case data structure has been populated; and
   storing the indicator in the first content field of the first case data structure of the memory device.

10. The method of claim 9, wherein the indicator includes a visual indication displayed at the display device.

11. The method of claim 8, further comprising:
   storing a link to the second content field of the second case data structure in the first content field of the first case data structure of the memory device.

12. The method of claim 8, wherein the first industrial machine or system is the same as the second industrial machine or system.

13. The method of claim 8, wherein the first industrial machine or system is different than the second industrial machine or system.

14. The apparatus of claim 8, wherein the first case corresponds to a current case, and wherein the second case corresponds to a prior case.

* * * * *